United States Patent Office 2,817,595
Patented Dec. 24, 1957

2,817,595

PREPARATION OF CHALK RESISTANT ANATASE PIGMENT

Anthony T. Kalinowski, Rahway, N. J., assignor to National Lead Company, New York, N. Y., a corporation of New Jersey No Drawing. Application February 4, 1954, Serial No. 408,279

4 Claims. (Cl. 106—300)

This invention relates in general to a method for preparing a titanium dioxide pigment and more especially to a method for preparing anatase titanium dioxide pigment having improved color, good chalk resistance and improved brightness.

It has been noticed that coating compositions such as, for example, oil base paints, enamel primers and the like, prepared from a conventional anatase form of titanium dioxide possess relatively poor resistance to chalking, and in order to overcome this characteristic deficiency of a conventional anatase titanium dioxide pigment, it has been customary to add small amounts of antimony oxide, either at hydrolysis of a titanium sulfate solution, or, to a precipitated titania hydrate prior to calcination; and then to calcine the treated pigment to develop the desirable pigment properties of tinting strength, color and chalk resistance. Although the addition of small amounts of antimony has been found to give improved chalk resistance, the final pigment appears to suffer in other respects, namely, to have a yellow tone and to be less bright than a conventional anatase pigment, i. e. one which has not been treated with antimony oxide.

Accordingly, an object of the instant invention is to provide a method for producing an anatase titanium dioxide pigment which will have not only high chalk resistance but good color and brightness. Another object is to provide a simple and economical method for treating anatase titanium dioxide hydrate in the absence of antimony oxide to produce a pigment having chalk resistance at least equal to or superior to that of antimony treated anatase pigment, and also superior color and brightness. A still further object of the invention is to produce an anatase pigment having the advantages enumerated above and which in addition is non-toxic and suitable for use in lithographic inks, refrigerator primers and enamels.

In its broadest aspects, the instant invention contemplates a method for producing an improved anatase titanium oxide pigment which comprises calcining hydrous titanium oxide at elevated temperatures in the presence of minor amounts of potassium, barium and phosphorus compounds. More specifically, this invention relates to a method for producing an anatase titanium oxide pigment having improved chalk resistance, good color and high brightness which comprises calcining hydrous titanium oxide at temperatures in the range of about 900° C. to about 1100° C. and preferably at about 1000° C. in the presence of barium and phosphorus compounds in the range, on a $TiO_2$ basis, of from about 0.2% to about 0.5% calculated as the oxides, and from about 0.6 to 1% potassium compound calculated as potassium sulfate.

By and large the major portion of the world production of hydrous $TiO_2$ is made from an ilmenite ore typical of which are the ilmenite ores from India, sometimes, referred to in the art as Quilon ore, and the ilmenite ores from Florida, both of which types of ore contain significant amounts of phosphorus. Ilmenite ores are also found in Norway and in Tahawus, New York. These latter ores contain only minute quantities of phosphorus, and inasmuch as the present invention is concerned with the use of a phosphorus compound as one of the constituents for producing the improved anatase pigment of this invention, it is preferred to use a Quilon or Florida ilmenite ore. It will be understood, however, that other types of ilmenites may be used by adding phosphates thereto.

In general, a titanium dioxide pigment material of high purity and tinting strength is produced from an ilmenite ore by dissolving the ore in strong acid such as, for example, sulfuric acid, and heating the mixture to form a digestion cake which is dissolved in water to form a solution, the iron values of which are thereafter reduced to the ferrous state. After clarification of the reduced solution it is crystallized, concentrated and then hydrolyzed to form and precipitate out the titanium values as hydrous titanium oxide. The hydrate is then filtered and washed to remove soluble salts and any uncombined sulfuric acid, and is thereafter treated with an alkali metal salt and calcined. Calcination serves not only to remove the combined or absorbed water and acid from the hydrate but to develop the crystal structure of the calcine so that the calcined pigment will have good tinting strength, low oil absorption, good color and other desirable characteristics of a pigment for use in paints, enamels and other covering compositions.

In carrying out the process of the instant invention in which precipitated raw anatase hydrate is treated with alkali metal and alkaline earth metal salts in order to obtain the improved anatase pigment referred to above, relatively small amounts of the salts of potassium and barium are added to the hydrate and, in the absence of a sufficient amount of phosphorus compound in the hydrate itself, then a compound of phosphorus. These compounds are admixed with or otherwise incorporated in an aqueous slurry or paste of relatively pure anatase hydrate prior to calcination, the respective salts of barium and phosphorus, calculated as oxides, being present in amounts in the range of from about 0.2% to about 0.5%, and somewhat larger amounts of potassium, the amount of potassium, as sulfate, being in the range of from about 0.6% to 1%.

More specifically, the amount of potassium added as potassium sulfate generally should be within the above mentioned limits and preferably should be about 0.8% based on the weight of the $TiO_2$ in the hydrate. When amounts in excess of 1% are employed, the pigment tends to sinter and form large aggregates whereas when amounts less than 0.6% are employed, the pigment is apt to be hard and gritty.

In this connection it should be pointed out that inasmuch as the potassium sulfate is soluble in water, small amounts will be lost during the subsequent dewatering treatment of the admixture and consequently, when referring to the amount of potassium sulfate added, it will be understood that these are the amounts retained in the admixture after dewatering.

With respect to the barium compound which is preferably barium oxide added in the form of a barium carbonate slurry, it has been found that the barium oxide should be in the range described above and that when amounts in excess of 0.5% are employed, the calcined pigment will be extremely difficult to disperse in wet milling whereas when the amount of barium oxide is less than 0.2%, there will be no significant improvement in the chalking characteristics of the pigment.

As pointed out above, since Quilon and Florida ores contain significant amounts of phosphorus calculated as $P_2O_5$ which is not removed to any appreciable extent during digestion of the ore and subsequent hydrolysis, the resulting titania hydrate may contain sufficient phosphate to achieve the improved results of this invention. However, should an ilmenite of extremely low phosphorus content be used, then it will be necessary to add additional amounts of phosphate, preferably in the form of phosphoric acid, in order to obtain the necessary phosphate content in the pigment. Generally, the phosphorus pentoxide content should be within the range specified above, i. e. from about 0.2% to about 0.5% on a $TiO_2$ weight basis. A phosphate content higher than about 0.5% as phosphorus pentoxide, is undesirable since the tinting strength and color of the resulting product will be impaired while less than about 0.2% phosphorus pentoxide is insufficient to obtain the optimum particle size of the calcined pigment material.

It will be apparent that the amounts of barium, phosphorus and potassium used to secure the improved pigment properties hereinafter described are not only small but are also critical to the successful production of anatase pigment having these improved properties.

Obviously, the potassium, barium and phosphate values may be added in various forms. For example, although it is preferred to employ potassium sulfate as the source of the potassium values, it will be understood that the instant invention may be practiced by utilizing potassium hydroxide, potassium carbonate or the like. Likewise, although it is convenient to employ a slurry of barium carbonate, it is not beyond the scope of the invention to employ barium chloride or other barium compounds. Similarly, the phosphate values may be introduced into the hydrate in the form of the anhydride or as phosphoric acid. It is also within the purview of the invention to add the barium and phosphate values in the form of dibasic or tribasic barium phosphate.

After incorporation of the barium, potassium and phosphate compounds into the hydrate slurry, the resulting mixture is thoroughly stirred and thereafter excess water is removed by filtering or by similar types of dewatering operations, whereupon the mixture is calcined in a conventional type calciner for a sufficient length of time to develop the desired pigment properties in the anatase pigment material.

In effecting calcination, temperatures of the order of those normally employed in calcining anatase pigments may be used although it has been found that with the admixture of barium, potassium and phosphorus compounds into the hydrate, temperatures as high as 1100° C. may be used for an extended period of time to develop the desired properties of the pigment material.

After calcination, the pigment material is cooled and subsequently subjected to grinding or other finishing operations to produce an anatase pigment which when incorporated in a paint vehicle will produce a covering composition having high brightness, good color and good resistance to chalking.

It has been found that the highly superior characteristics of the pigment produced by the process of this invention depend upon the use of each of the compounds of barium, potassium and phosphorus; and that these superior characteristics will not be obtained when any one of these compounds is omitted. The potassium or barium compounds alone or in combination will not yield the highly beneficial results secured by the combination of the compounds of potassium, barium and phosphorus. If the potassium compound alone is used, then the rate of chalking of the calcined pigment is unsatisfactory while if the barium compound alone is used, the calcined pigment is coarse and has low tinting strength. Similarly, a calcined product containing potassium and barium compounds but no phosphorus compound has poor tinting strength and inferior color while calcined pigments incorporating potassium and phosphorus compounds alone have substantially low chalk resistance. It is evident, therefore, that the effects of potassium, barium and phosphorus compounds are not merely additive but produce a result which is wholly different from the results which may be expected from the known characteristics of the individual compounds.

Pigment material prepared as described above was tested for its superiority over an antimony treated anatase pigment and a conventional anatase pigment by admixing a sample of each type of pigment with a vehicle such as, for example, a vehicle of the type used in formulating a refrigerator enamel. One such formulation which is typical comprises a mixture of about 20% pigment, by volume, and a synthetic resin such as, for example, Glyptal including about 40% of a non-volatile vehicle. The pigment is mixed with enough vehicle to wet the pigment which is then passed through a three roll mill tight set. It will be appreciated that the specific enamel formulation described above is for illustrative purposes only and that any other suitable formulation may serve for comparing the relative brightness, yellow index, chalking and similar characteristics of enamels prepared respectively from an antimony treated anatase pigment, a conventional anatase pigment and the anatase pigment of the instant invention.

The distinctly superior characteristics of an enamel formulated from an anatase pigment containing potassium, barium and phosphorus compounds are shown by the following table:

GLYPTAL ENAMELS PREPARED FROM TREATED ANATASE PIGMENTS

| Treatments | K—Ba—P | | K—Sb | | K (Conventional) |
|---|---|---|---|---|---|
| Code No | A | B | C | D | E |
| Vehicle, g. to wet 100 g. $TiO_2$ | 40.0 | 40.0 | 53.6 | 48.2 | 53.8 |
| Grinding Time (Sec.) | 106 | 132 | 260 | 162 | 106 |
| Brightness, Percent | 90.5 | 90.4 | 86.6 | 88.4 | 88.7 |
| Yellow Index, Percent | 4.8 | 4.5 | 6.9 | 7.2 | 3.6 |
| Chalking (Weeks) | 21 | 17 | 21 | 17 | 9 |

The brightness, yellow index and chalking values given in the foregoing table were determined by well known standard tests which are described briefly as follows:

Each of the selected types of treated anatase pigment was mixed with a vehicle of the type used in formulating an enamel, as hereinabove described. Test specimens of the respective enamels, air dried, were then tested for their brightness and yellow index values by means of a Hunter reflectometer using the blue, green and amber filters by means of which the percent light reflectance values of the respective pigments were obtained. The percent light reflectance value obtained by use of the green filter is a direct measure of the percent brightness of the specimen pigment being tested while the yellow index value is obtained by the formula $$y = \frac{b-a}{g} \times 100$$

where ($y$) is the yellow index, ($b$) is the reflectance value of the pigment speciment using a blue filter, ($a$) the reflectance value of the pigment specimen using the amber filter and ($g$) the reflectance value of the pigment specimen using the green filter.

The procedure followed in making chalk tests of the respective enamels comprises preparing test specimens of the enamels in the manner hereinabove described but with the addition of lamp black added to the extent of 1% of the enamel. Two coats of each enamel were sprayed onto steel panels, and air dried whereupon the panels were exposed at a 45° angle south for chalking and corrosion observations.

In order to illustrate the instant invention further, the following examples are given:

*Example 1*

Hydrous titanium dioxide was prepared by thermal hydrolysis of a solution of ilmenite and sulfuric acid and was analyzed as containing about 0.3% $P_2O_5$. To the hydrous titanium dioxide was added, on a $TiO_2$ weight basis, an aqueous slurry comprising 0.2% barium oxide added as barium carbonate, 0.8% potassium sulfate, on a retained basis, and 0.2% phosphorus pentoxide added as phosphoric acid. After thoroughly mixing the ingredients, the mixture was dewatered and thereafter calcined for a period of two hours in a rotary calciner heated to a temperature of 1000° C. The resulting product was wet milled, hydroclassified, treated with 1% $Al_2O_3$, dried, and then dry milled to produce a fine anatase titanium dioxide pigment acceptable for commercial use.

About 100 grams of this pigment was added to about 40 grams of a Glyptal enamel vehicle prepared as hereinabove described and the mixture ground for about 132 seconds, after which the enamel was tested for its brightness, yellow index and chalking values. The material was found to have a brightness of about 90.4%, which was significantly above the brightness values of either an antimony treated or a conventional anatase titanium dioxide pigment. When tested for its yellow index, the enamel showed a yellow index value appreciably lower than that of an enamel pigmented with an antimony treated anatase pigment and almost as low as the yellow index of one pigmented with a conventional anatase pigment. The improved enamel was also painted on panels for a chalk test and after being exposed for 25 weeks showed chalking equal to that of an enamel pigmented with antimony treated pigment and considerably better than the chalking of an enamel pigmented with a conventional anatase pigment.

*Example II*

To a titanium dioxide hydrate prepared as described in Example I was added, on a $TiO_2$ weight basis, a slurry consisting of 0.5% barium oxide added as barium carbonate, 0.8% potassium sulfate, on a retained basis, and 0.2% phosphorus pentoxide added as phosphoric acid. This mixture was treated as described in Example I to produce a finished pigment material which was then incorporated in a Glyptal enamel vehicle as hereinabove described and the resulting enamel was tested for brightness, yellow index and chalking values. Again, the enamel prepared from the treated anatase pigment of this invention disclosed brightness values higher than the enamels pigmented with either the antimony treated anatase pigment or a conventional anatase pigment. Likewise, as indicated in the foregoing table, the yellow index of the enamel was lower than the yellow index of the enamel pigmented with an antimony treated anatase pigment and compared favorably with the yellow index of the enamel prepared from a conventional anatase pigment. Moreover, the chalking resistance of the enamel prepared from the treated anatase pigment of this invention was considerably higher than that of an enamel prepared from a conventional anatase pigment.

As will be evident from the foregoing description of the instant invention, the latter affords the production of an anatase titanium dioxide pigment material which when incorporated in a paint or enamel vehicle produces a coating composition having brightness and yellow index values which are superior to those of enamels pigmented with antimony treated anatase pigment; and chalking characteristics at least equal to those of enamels prepared from antimony treated pigments and considerably better than those prepared from conventional anatase pigments.

While this invention has been described and illustrated by the examples shown, it is not intended to be strictly limited thereto, and other variations and modifications may be employed within the scope of the following clams:

I claim:

1. A process for producing a chalk resistant $TiO_2$ pigment material of the anatase crystalline structure having improved brightness and color which comprises calcining a $TiO_2$ hydrate at a temperature from 900° C. to 1100° C. in the presence of potassium, phosphorus and barium wherein the barium and phosphorus values, added as barium carbonate and phosphoric acid respectively, are present as oxides in relatively small amounts ranging from about 0.2 to about 0.5% calculated as oxides on a $TiO_2$ weight basis while the compound of potassium, added as potassium sulfate, is present in amounts ranging from about 0.6 to about 1% on a $TiO_2$ weight basis.

2. A process for producing a chalk resistant $TiO_2$ pigment material of the anatase crystalline structure having improved brightness and color which comprises forming an anatase $TiO_2$ hydrate, preparing a mixture of phosphoric acid and potassium sulfate, adding said mixture to said $TiO_2$ hydrate, preparing and adding a slurry of barium carbonate to the admixture of hydrate, phosphoric acid and potassium sulfate to form an admixture wherein the barium carbonate and phosphoric acid are present in relatively small amounts ranging from about 0.2 to about 0.5% calculated as oxides on a $TiO_2$ weight basis and the potassium sulfate is present in an amount ranging from about 0.6 to about 1% on a $TiO_2$ weight basis, and then calcining said admixture at a temperature in the range of from 900° C. to 1100° C.

3. A process for producing a chalk resistant $TiO_2$ pigment material of the anatase crystalline structure having improved brightness and color which comprises forming an anatase $TiO_2$ hydrate containing phosphorus, adding potassium sulfate to said hydrate, preparing a slurry of barium carbonate and adding said slurry to said mixture of hydrate and potassium sulfate wherein the barium is present in an amount ranging from about 0.2 to about 0.5% and said potassium sulfate is present in an amount ranging from about 0.6 to about 1% calculated as oxides on a $TiO_2$ weight basis, adjusting the phosphorus oxide content of the admixture to an amount within the range of from about 0.2 to about 0.5% on a $TiO_2$ basis, drying said admixture and then calcining the dried admixture at a temperature of about 1000° C. for about two hours.

4. A chalk resistant pigment consisting essentially of anatase $TiO_2$ and the oxides of potassium, phosphorus and barium said barium and phosphorus oxides being present in amounts from 0.2 to 0.5% and said potassium oxide being present from 0.6 to 1% on a $TiO_2$ weight basis.

References Cited in the file of this patent

UNITED STATES PATENTS

| Number | Name | Date |
|---|---|---|
| 1,412,027 | Washburn | Apr. 4, 1922 |
| 2,187,050 | Patterson | Jan. 16, 1940 |
| 2,266,793 | Oppermann | Dec. 23, 1941 |
| 2,273,431 | Booge | Feb. 17, 1942 |
| 2,299,120 | Allan | Oct. 20, 1942 |
| 2,304,947 | Monk | Dec. 15, 1942 |
| 2,346,322 | Nelson | Apr. 11, 1944 |
| 2,365,135 | Ancrum | Dec. 12, 1944 |
| 2,668,776 | Miller | Feb. 9, 1954 |